(12) United States Patent
Barziza

(10) Patent No.: US 7,133,205 B2
(45) Date of Patent: Nov. 7, 2006

(54) ATMOSPHERIC STABILIZER FILTER AND METHOD

(76) Inventor: Samuel W. Barziza, 1 Robin Hood La., Conroe, TX (US) 77301

( * ) Notice: Subject to any disclaimer, the term of this patent is extended or adjusted under 35 U.S.C. 154(b) by 0 days.

(21) Appl. No.: 10/906,649

(22) Filed: Feb. 28, 2005

(65) Prior Publication Data

US 2005/0190448 A1  Sep. 1, 2005

Related U.S. Application Data

(60) Provisional application No. 60/521,143, filed on Feb. 26, 2004.

(51) Int. Cl.
*G02B 23/00* (2006.01)
*G02B 5/18* (2006.01)

(52) U.S. Cl. .................. 359/566; 359/568; 359/569
(58) Field of Classification Search ............... 359/566, 359/568, 569
See application file for complete search history.

(56) References Cited

U.S. PATENT DOCUMENTS

| | | | |
|---|---|---|---|
| 5,497,269 A * | 3/1996 | Gal | 359/615 |
| 2003/0179433 A1 * | 9/2003 | Hunt | 359/279 |

* cited by examiner

*Primary Examiner*—Fayez G. Assaf
(74) *Attorney, Agent, or Firm*—David B. Dickinson; Lundeen & Dickinson, LLP

(57) ABSTRACT

A diffracting optical filter for use with telescopes provides a plurality of cells separated by opaque lines on an translucent substrate, the spacing of the cells proportionally spaced to match the Airy disk of a specific optical system for the telescope to aid observation through a turbulent atmosphere.

6 Claims, 4 Drawing Sheets

ATMOSPHERIC STABILIZER FILTER AND METHOD

This application claims the benefit of prior provisional application U.S. Ser. No. 60/521,143 filed Feb. 26, 2004.

BACKGROUND OF INVENTION

This present invention relates to an optical filter for use with telescopes; specifically to a diffracting filter composed of a plurality of spaced translucent cells separated from each other by a thin opaque border in which the spacing of the cells is proportional to the Airy disk of a specific optical system for the telescope to aid observation through a turbulent atmosphere.

Turbulent atmospheric phenomena limit the visual range of observations in the 380 nm to 750 nm wavelength ($\lambda$) range of visible light. All forms of telescopic astronomical investigation will benefit from such a device; ranging from casual visual observations to in-depth detailed scientific imaging, spectroscopic, photometric, astrometric, and interferometric investigations.

Driven by the thermal energy of the sun, the motion of the earth's atmosphere changes the index of refraction and therefore the optical path length of light passing through the atmosphere and entering the telescope. The light which reaches the telescope is distorted by this turbulent atmosphere even though it started as an almost perfect planar wave front. Atmospheric turbulence changes occur in milliseconds and this led to the development of adaptive optical systems. Typical astronomical telescopic observation suggests that isoplanar wave fronts are only about 10 cm square. At astronomical observatories usually on top of mountain ranges, the isoplanar wave front may be as large as 20 to 30 cm when the "seeing is good." Over any isoplanar region, the wavefront is relatively smooth and provides little curvature with a difference of about $\lambda/17$. A rule of thumb adopted by astronomical observers is that if wave distortions are less than $\lambda/10$ the image quality will be good.

Since telescopes can only collect a portion of the incident light to be reformed into an image, there will always be some diffraction in all systems. The light will deviate from straight-line propagation and spread out somewhat in the image plane. The effect of turbulence on an image formed by a telescope depends on the size of the aperture of the telescope. If the image is formed from a very small aperture, most of the wave front will be undistorted and planar. The larger the diameter of light allowed causes the Airy disk to be formed which moves as the wave front is distorted. The image is thus a superposition of shifting Airy disk spots resulting in a shimmering blur. The larger aperture will collect more light but will not proportionately improve the resolution of the optical system.

The critical aperture size at which atmospheric blurring occurs is a measure of the turbulence. This aperture is called the Fried parameter, $r_0$, and corresponds to the size of the region over which the incoming wavefront can be taken to be essentially planar. When this parameter $r_0$ exceeds 30 cm, a very distant star will be perfectly imaged as an Airy disk. As the turbulence increases, the Fried parameter $r_0$ decreases. Furthermore, as the wavelength increases, the Fried parameter $r_0$ increases, since the Fried parameter is proportional to the wavelength $\lambda$. The resolution of a telescope in the atmosphere is no better than $1.22\lambda/r_0$ and since $r_0$ is rarely above 20 cm, even the largest telescopes have a resolving power little more than that of a 8" telescope. Adaptive optics reduces the sizes of the isoplanar mirror assemblies and then coordinates them based upon atmospheric turbulence, but is both complicated and expensive and beyond the budget of the amateur astronomical observer.

When a telescope with a circular aperture receives plane waves, rather than being an image "point" the light actually spreads out into a small circular spot called the Airy disk containing about 84% of the energy surrounded by several faint rings. The radius of the Airy disk determines the overlapping of the neighboring images and therefore the resolution of the telescope. A telescope which is as perfect as may be possible is referred to as a diffraction-limited telescope. In a turbulent atmosphere, light traveling through the atmosphere is diffracted and therefore arrives out-of-phase with collimated light entering the atmosphere from the cosmological source. The turbulent atmosphere causes starlight to "twinkle" but makes viewing less clear. By placing a diffraction grating over the light path, the refracted starlight is eliminated and the undiffracted portion of the light is allowed to pass through the Atmospheric Stabilization Filter to the focal plane of the instrument, which may either be the pupil of the observer or the focal plane of a CCD camera.

Active optics requires the precise alignment of the main mirror in a large telescope, in conjunction with the precise alignment of the secondary mirror and any other auxiliary optics used in the optical system. Typically active optics is not a continuous real-time alignment system, but rather is employed either in hourly increments during an observation run or immediately before each observation run. Substantial and expensive equipment support equipment and technician time is required for either type of stabilization system. Maintenance of such systems often interferes with observation time, limiting and therefore decreasing time-critical investigations.

Currently, there is no known device, passive in nature (i.e. having no moving parts, and no electrical apparatus) that attaches to a telescope and suppresses atmospheric turbulence. Most devices dealing with astronomical observations through atmospheric turbulence rely upon adaptive optics, or active optics. Both adaptive optics and active optics involve considerable technical sophistication and are limited to small areas of the sky. Adaptive optics for telescopic use in real time observations comprises a special deformable mirror, wavefront sensor, and circuitry intended to match the distortion of the atmosphere to selective movement of the deformable mirror system. A special laser is used to create an artificial guide-star for tracking purposes. Special computers and software must be accessed to automatically make the adaptive movements to the mirror system.

SUMMARY OF INVENTION

The present apparatus is composed of a transparent quartz substrate or any optical glass, with metallic or synthetic metallic lines etched in the substrate. The quartz substrate can either be circular or square in shape to match available optical trays and holders. Typically, the apparatus is round and mounted in a circular holder to be adapted to fit in the eyepiece of a telescope in a manner well known in this art. The grating on this substrate is generally square, although circular or hexagonal etchings could be used without departing from the spirit of the invention. This filter is intended to be placed between the eyepiece and the telescope or between the telescope and the CCD. The light exiting the telescope and entering the filter then exists the filter into the eyepiece or the CCD.

The Atmospheric Stabilizer Filter [ASF] of the present invention is comprised of a quartz substrate with metallic lines etched on an exterior surface. The quartz substrate is coated with a layer of chrome. However other coatings can be used without departing from the spirit or purpose of this invention.

The chrome coating is then processed by standard photoetching processes to leave a specified pattern on the substrate. The pattern is designed to match the Airy disk of a telescope. By matching the Airy disk of the specific telescopic system with a specific focal ratio employing the filter, diffraction of the induced wavefronts caused by the turbulent atmosphere are maximized, while the wavefronts cause by the incident collimated light which reaches the lens is focused in the Airy disk of the focal plane.

This filter apparatus, to be used in an environment of atmospheric turbulence, is a translucent optical substrate onto which is etched a diffraction grate, providing a plurality of translucent cells separated by opaque lines, each line having a width of about $1.22\lambda/D$ and cell width about six to twelve times the width of the line, where $\lambda$ is the average wave length of the light entering the telescope (ie. around $555 \times 10^{-9}$ meters) and D is the aperture diameter of the telescope. The diffraction grate can provide cells between 4 microns and 8 microns in width and the line widths of the lines between each cell between 0.333 microns and 1.333 microns.

This optical filter system provides a translucent optical substrate which may be formed from optical quality glass or other materials well known to those in the optical industry which is photoetched to create a cross-hatched grating on said substrate to thereby provide opaque lines on said substrate. The optical filter is set in a holder to facilitate attachment to an optical device or telescope.

Alternatively, the optical filter can provide photoetched cross-hatched opaque lines which are between 0.4 and 0.6 microns and thereby providing cells with a width of each translucent cell between 5 to 7 microns.

The optical filter is used by forming a diffraction grating on an transparent optical substrate, said diffraction grating having a plurality of openings, each of said openings substantially equivalent to the size of the Airy disk of the telescope; and, thereafter attaching said diffraction grating in an optical eyepiece of the telescope.

DETAILED DESCRIPTION OF A PREFERRED EMBODIMENT OF THE INVENTION

Figure 1:
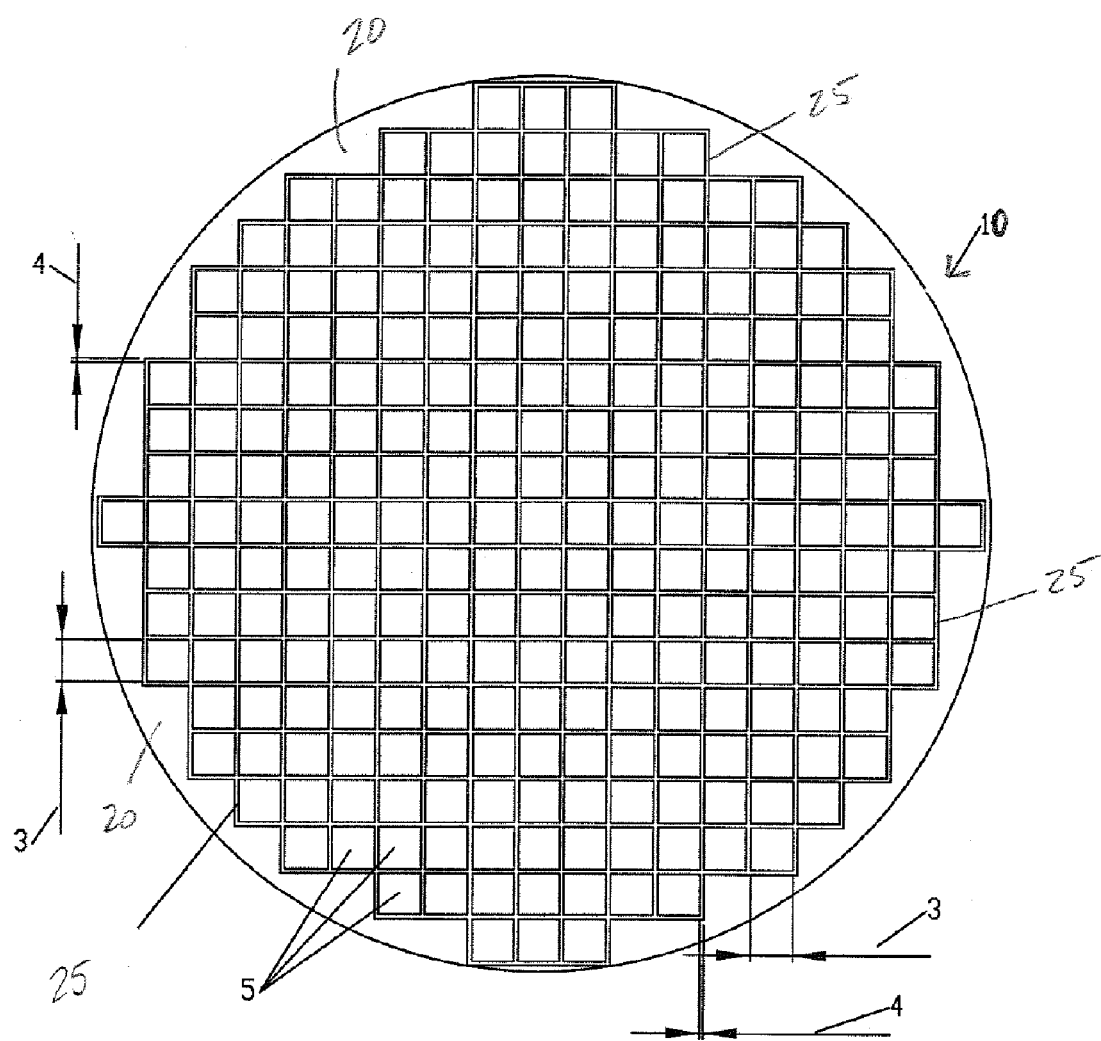
FIG. 1 is a top perspective view of the Atmospheric Stabilizer Filter [ASF] assembly.

As shown in FIG. 1, the Atmospheric Stabilizer Filter plate 10 is fashioned from a quartz substrate 20. Lines 25 are etched on an exterior surface of the quartz substrate 20, such as by photoetching. In this embodiment, the lines are etched to form a screen with the line width 4 of approximately 0.5 micron ($0.5 \times 10^{-6}$ meters) and providing a space 3 between each adjacent line of approximately 6 microns ($6.0 \times 10^{-6}$ meters). The ratio of line spacing to line width is believed to be optimal if kept in the 6 to 1 to a 12 to 1 ratio. The spaces 5 between adjacent perpendicular lines permit the transmission of coherent essentially planar wave fronts through the filter. It is believed that other geometric designs such as hexagonal openings between adjacent lines or circular openings can be substituted on the existing plate design without departing from the spirit of this invention.

Figure 2:
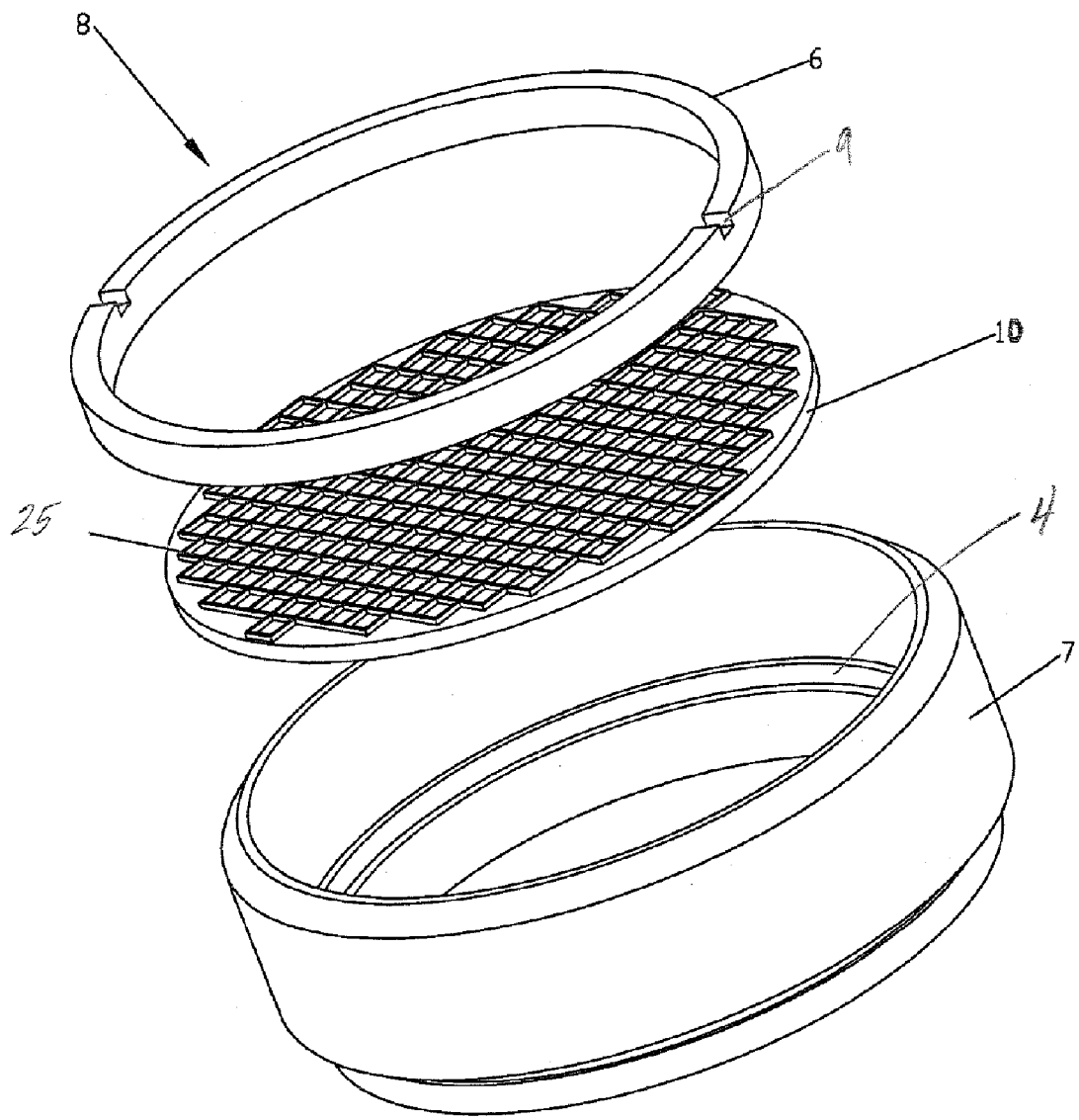
FIG. 2 is an exploded view of the Atmospheric Stabilizer Filter in a standard carrier.

As shown in FIG. 2, retainer ring 6 used to hold the Atmospheric Stabilizer Filter assembly 8 in the main filter holder 7 providing an inner cylindrical surface through its longitudinal extent, a portion of which is sized slightly larger than the plate 10. A shoulder 4 is formed on the inner cylindrical surface of the filter holder 7 and the plate is impinged on said shoulder by a retainer ring 6.

FIG. 2 is an exploded perspective view of the Atmospheric Stabilizer Filter [ASF] assembly 8 attached by retaining the ASF against the interior shoulder 4 on an interior surface of a main filter holder 7 in a manner well known in this art. Retainer ring 6 is inserted to hold the ASF 10 and may be screwed with notches 9 on said retainer ring 6 on threads (not shown) formed on the interior surface of the main filter holder 7, all in a manner well known in this art field.

Figure 3:
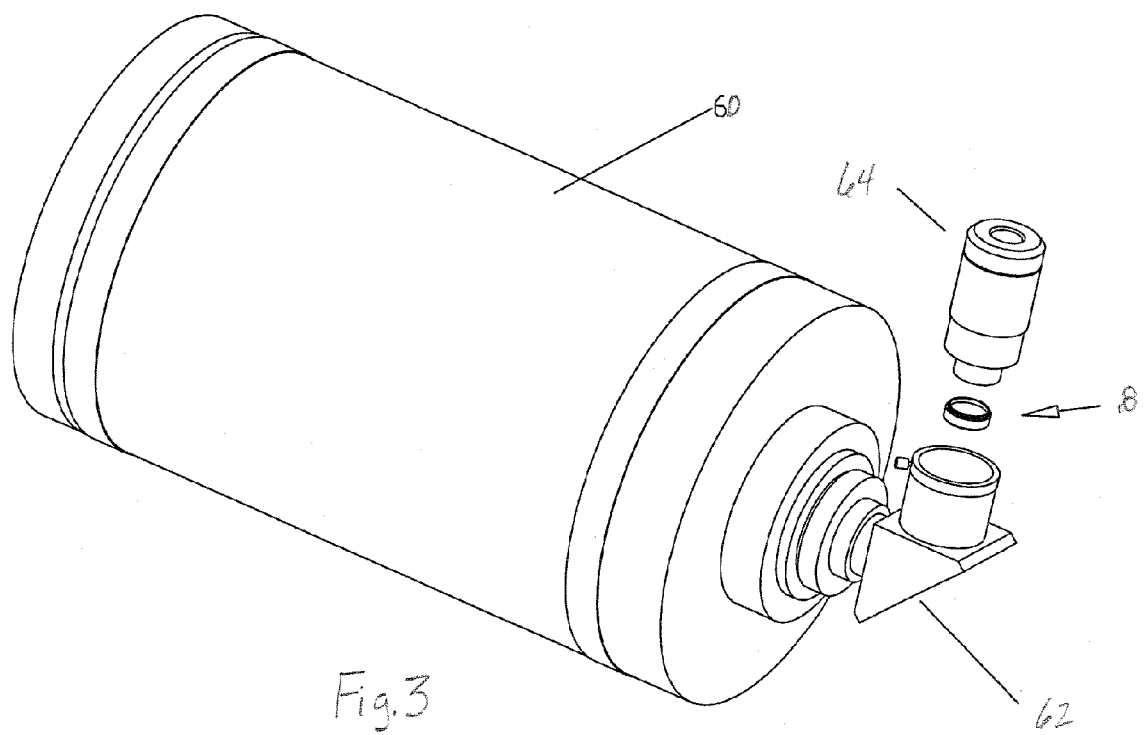
FIG. 3 is a schematic view of the Atmospheric Stabilizer Filter in use with a Schmidt-Cassegrain telescope with a standard optical eyepiece.

FIG. 3 discloses a typical visual application using a Schmidt-Cassegrain telescope 60, which is adapted to accept an eyepiece 64 connected to an eyepiece holder 62 that has a 90 degree angle reflecting mirror. The Atmospheric Stabilizer Filter [ASF] assembly 8 is attached between the eyepiece 64 and eyepiece holder 62, and can provide standard size mating surfaces or threads for such attachment.

Figure 4:
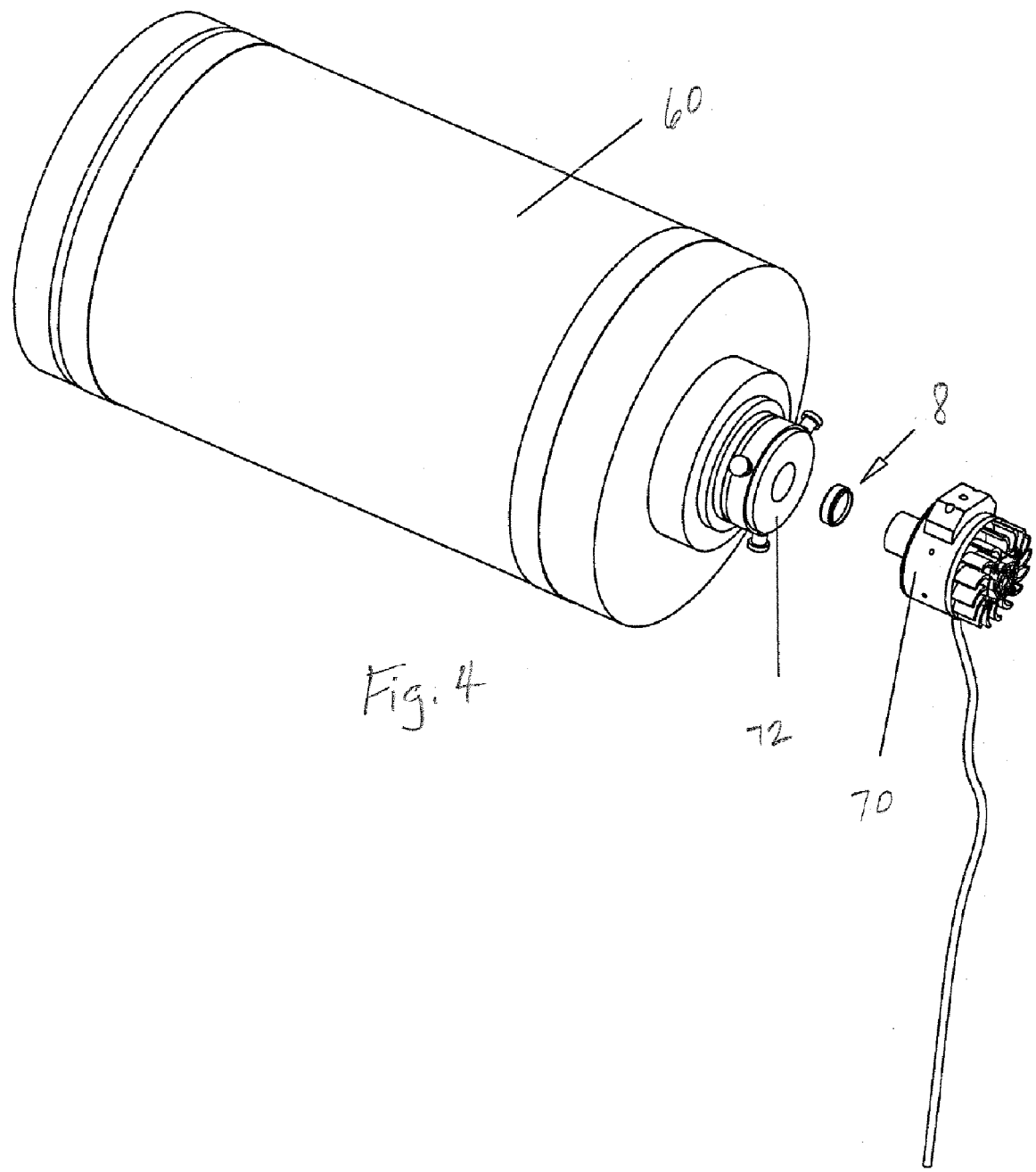
FIG. 4 is a schematic view of the Atmospheric Stabilizer Filter in use with a Schmidt Cassegrain telescope mounted in the optical path of CCD camera attachment.

FIG. 4 shown is an example of an imaging application. A telescope 60 is adapted to accept a CCD Camera 70, with the Atmospheric stabilizer Filter [ASF] assembly 8, and simple receptacle 72 for attaching the CCD Camera to the telescope. The Atmospheric Stabilizer Filter [ASF] assembly 8 is threaded onto the CCD Camera 70.

Although the description above contains many specifics, these should not be construed as limiting the scope of the invention but as merely providing illustrations of some of the presently preferred embodiments of this invention coming within the spirit and scope of the present invention that is limited only by the accompanying claims.

What is claimed is:

1. A passive apparatus for filtering atmospheric turbulence comprising:
    a translucent optical substrate; and
    a diffraction grate formed on a surface of said substrate providing a plurality of translucent cells separated by opaque lines, having a line width of about $1.22\lambda/D$, wherein D is the aperture diameter of a telescope, and a cell width about six to twelve times the width of the line.

2. The apparatus of claim 1 wherein the diffraction grate provides cells between 4 microns and 8 microns in width and the line width is between .333 microns and 1.333 microns.

3. A passive optical filter for use with an optical system comprising:
    a translucent optical substrate;
    a cross-hatched grating on said substrate providing opaque lines on said substrate thereby forming a plurality of uniformly spaced adjacent translucent cells each having a width equivalent to the Airy disk of the optical system; and,
    a holder for said optical filter to facilitate attachment to an optical device.

4. The optical filter of claim 3 wherein the cross-hatched opaque lines are between 0.4 microns and .6 microns and the width of each translucent cell is between 5 microns to 7 microns.

5. A method of viewing through a telescope in a turbulent atmosphere comprising:

forming a passive diffraction grating on an transparent optical substrate, said diffraction grating having a plurality of openings, each of said openings substantially equivalent to the size of the Airy disk of the telescope; and, attaching said diffraction grating in an optical eyepiece of the telescope.

6. A method of viewing through a telescope in a turbulent atmosphere comprising:

forming a passive diffraction grating on an transparent optical substrate, said diffraction grating having a plurality of openings, each of said openings having a size between 2 microns and 16 microns separated from each other by opaque lines having a width between 0.333 microns and 1.333 microns; and, attaching said diffraction grating in an optical eyepiece of the telescope.

* * * * *